Oct. 13, 1970    E. LESH    3,533,578
LIGHTER THAN AIR CRAFT NON-RIGID PRESSURE SHIPS AND
TETHERED GLIDER OR PLANE, HEAVIER THAN AIR
Filed Aug. 22, 1967    6 Sheets-Sheet 1
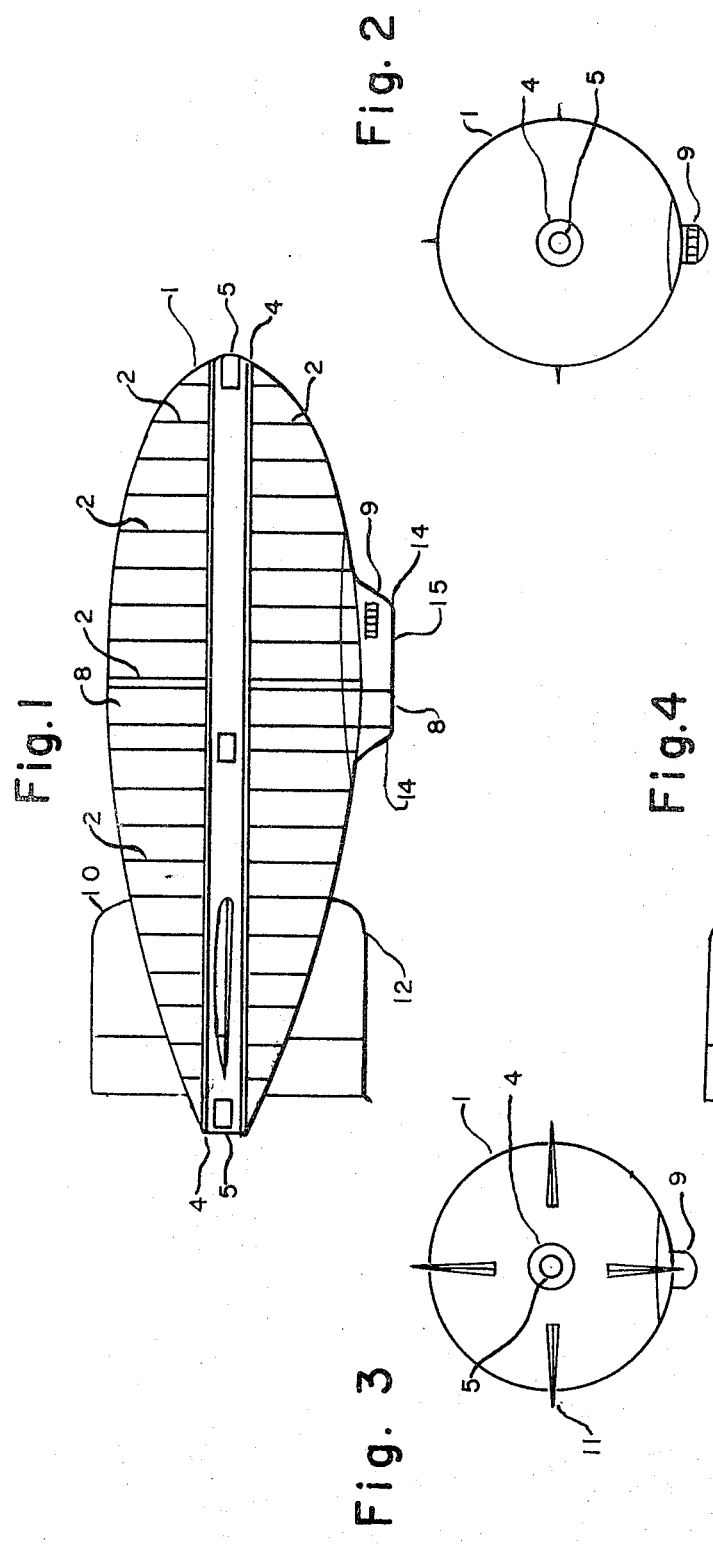
INVENTOR
Ed Lesh INVENTOR
Ed Lesh Oct. 13, 1970 E. LESH 3,533,578
LIGHTER THAN AIR CRAFT NON-RIGID PRESSURE SHIPS AND
TETHERED GLIDER OR PLANE, HEAVIER THAN AIR
Filed Aug. 22, 1967 6 Sheets-Sheet 5

INVENTOR
Ed Lesh

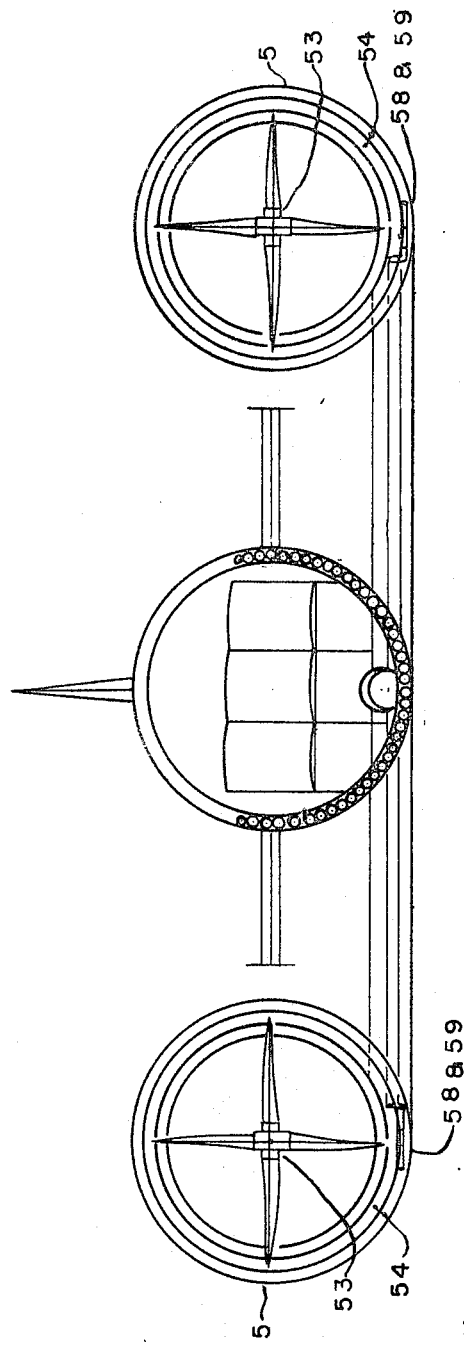
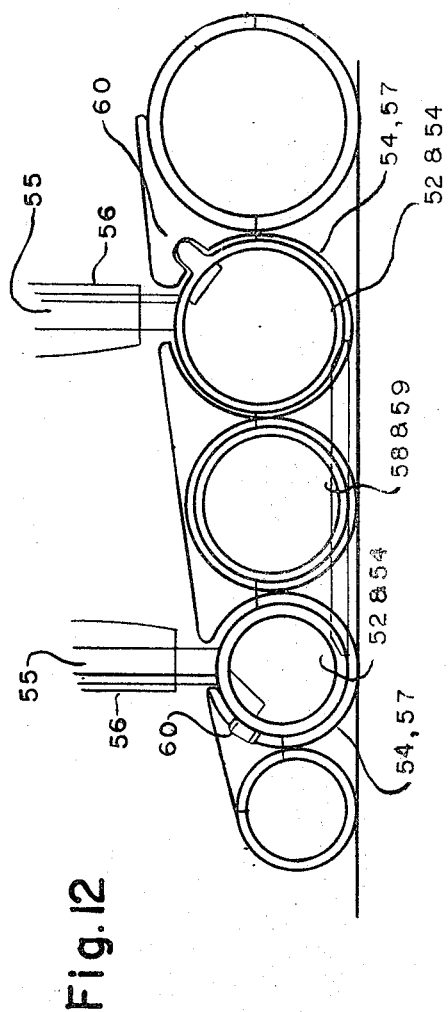

Oct. 13, 1970 E. LESH 3,533,578
LIGHTER THAN AIR CRAFT NON-RIGID PRESSURE SHIPS AND
TETHERED GLIDER OR PLANE, HEAVIER THAN AIR
Filed Aug. 22, 1967 6 Sheets-Sheet 5
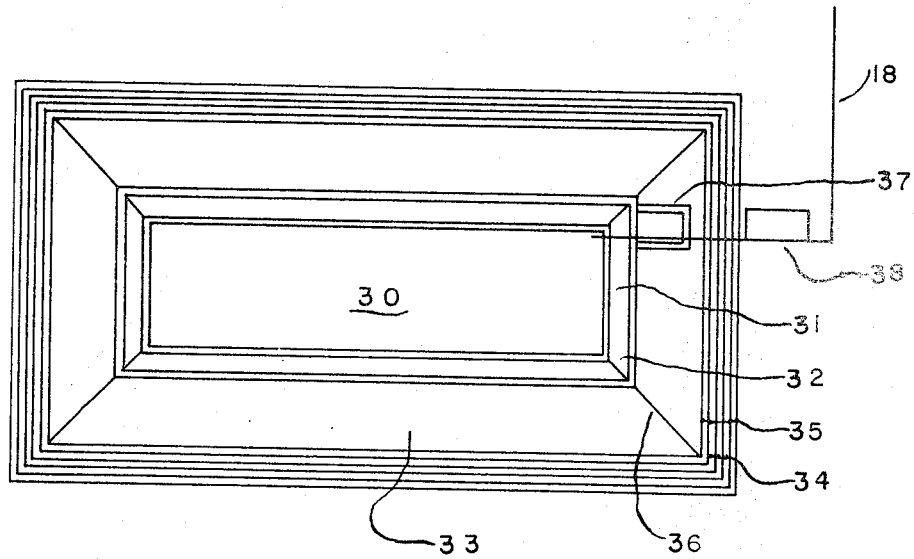
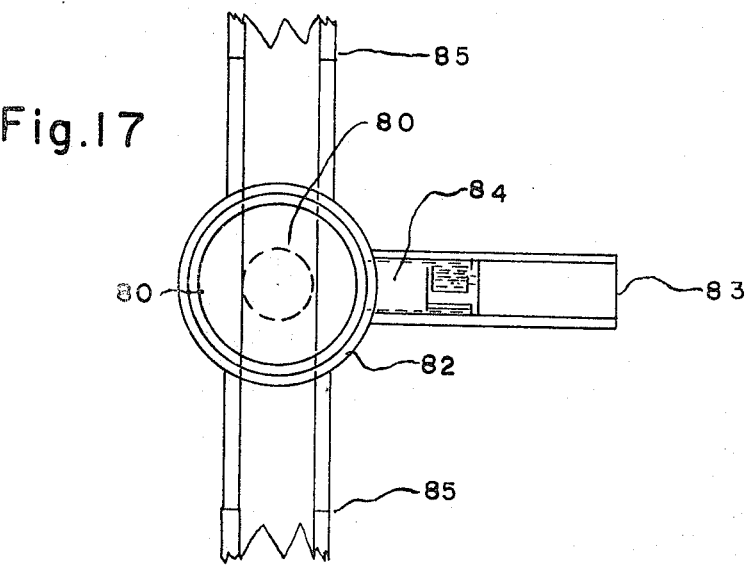
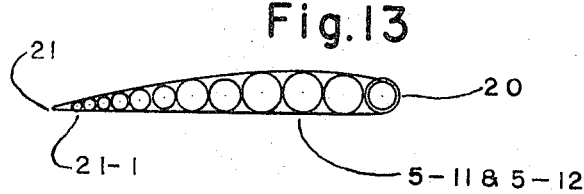
INVENTOR
Ed Lesh Oct. 13, 1970   E. LESH   3,533,578
LIGHTER THAN AIR CRAFT NON-RIGID PRESSURE SHIPS AND
TETHERED GLIDER OR PLANE, HEAVIER THAN AIR
Filed Aug. 22, 1967   6 Sheets-Sheet 6
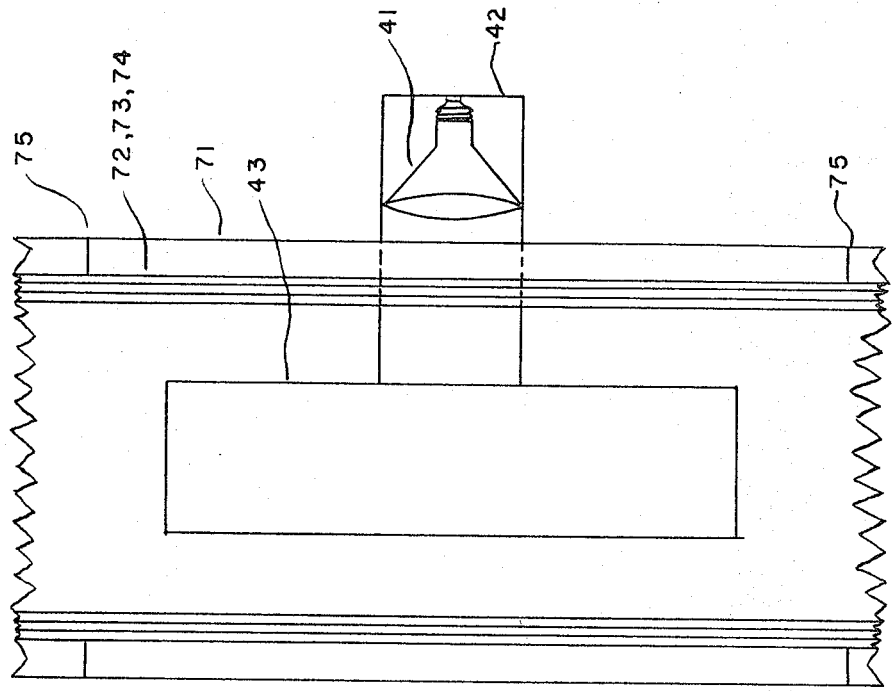
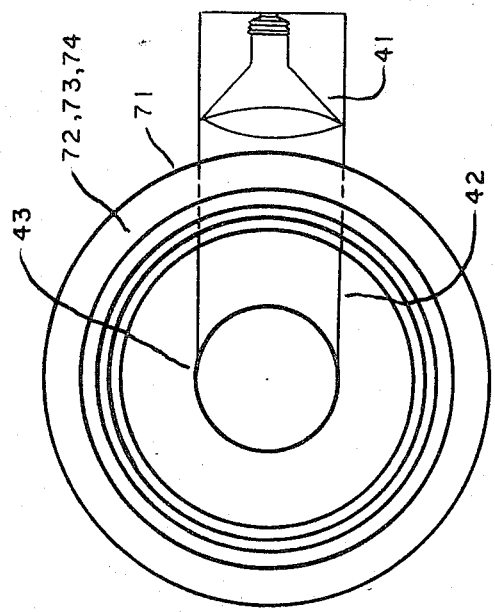
INVENTOR
Ed Lesh

United States Patent Office

3,533,578
Patented Oct. 13, 1970

3,533,578
LIGHTER THAN AIR CRAFT NON-RIGID PRESSURE SHIPS AND TETHERED GLIDER OR PLANE, HEAVIER THAN AIR
Ed Lesh, 1337 Woods Run Ave., Pittsburgh, Pa. 15212
Filed Aug. 22, 1967, Ser. No. 663,475
Int. Cl. B64b 1/62
U.S. Cl. 244—30                        7 Claims

ABSTRACT OF THE DISCLOSURE

A lighter than air craft is provided having an outer gas impervious envelope, a plurality of transverse walls dividing said envelope into a plurality of separate cells, an axial duct extending horizontally through the envelope from end to end providing an open passageway therethrough, thrust means in the duct carrying air from one end for discharge through the other to propel the envelope, a plurality of reserve cells in each main cell, means for selectively inflating each separate reserve cell and a cryogenic vessel mounted on the envelope to receive and discharge gas thereto, a source of liquid helium coolant and pump means for compressing helium into the cryogenic vessel whereby helium can be removed from the envelope and compressed and thereby saved when it is desired to reduce the lift of the envelope.

SUMMARY OF THE INVENTION

This invention relates to lighter than air craft, non-rigid pressure ships and tethered gliders or planes and particularly to such craft having a hull or envelope separated into cells by catenary curtains and having a hollow, generally axial wing in the form of a duct or tunnel extending through the craft and carrying thrust generating devices and a means for compressing and expanding the lift gas to change the lift characteristics of the craft.

Lighter than air craft have been known and used for many years. They have used heated gases, hydrogen and helium as the lift gas. Such devices are basically simply an envelope capable of containing the lift gas and a series of suspending cables or similar means for carrying a cabin with accessory drive means and the like. Such craft are subject to many disadvantages as compared to rigid aircraft. They have a limited load capacity, low speed, inability to change altitude without a change in lift capacity which means changing ballast or losing lift gas and a high loss of lift gas with each descent and high vulnerability to puncture and loss of buoyancy.

The present invention seeks to overcome or eliminate these problems by new structural arrangements.

Preferably I provide an outer envelope or hull of gas proof material such as Mylar and fiber glass cloth which in the inflated condition is of elongated elliptical shape having a bow and stern, a plurality of vertical cells within said envelope formed of gas proof material, the vertical walls acting as catenary curtains and struts for the envelope, a plurality of deflated reserve cells in each main cell, means for selective inflating each said reserve cell, a container on each vertical wall carrying inflated balloons, means for simultaneously spraying said reserve cell with an adhesive cement while releasing said balloons to seal faults in said main cell, a central hollow tunnel or duct extending through the envelope and through each main cell from bow to stern, thrust means in said duct moving air through said duct from bow to stern to provide thrust for movement of the envelope. Preferably the thrust means is at least one pair of counter rotating propellers forcing air through the duct. The duct is preferably formed of fiber glass and Mylar, preferably in the form of side by side annular cells which provide rigidity and strength. Preferably I provide a cabin fixed to the envelope and carrying a power source, a cryogenic system for liquefying the lift gas and a heating system for gasifying the liquid lift gas for delivery to the envelope.

Figure 5:
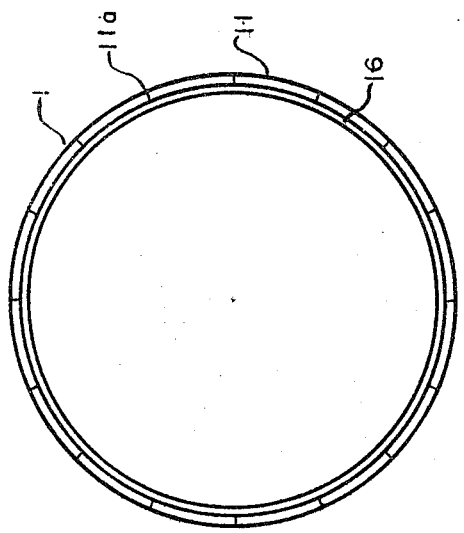
Figure 6:
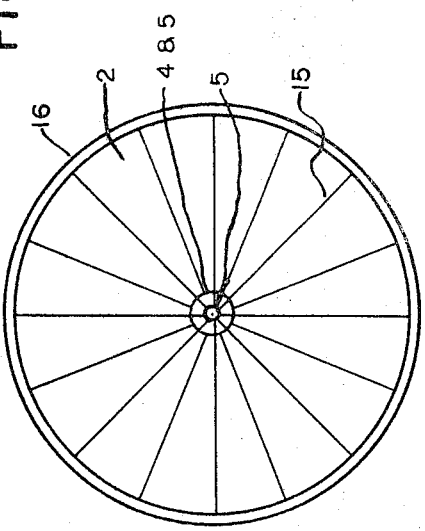
Figure 7:
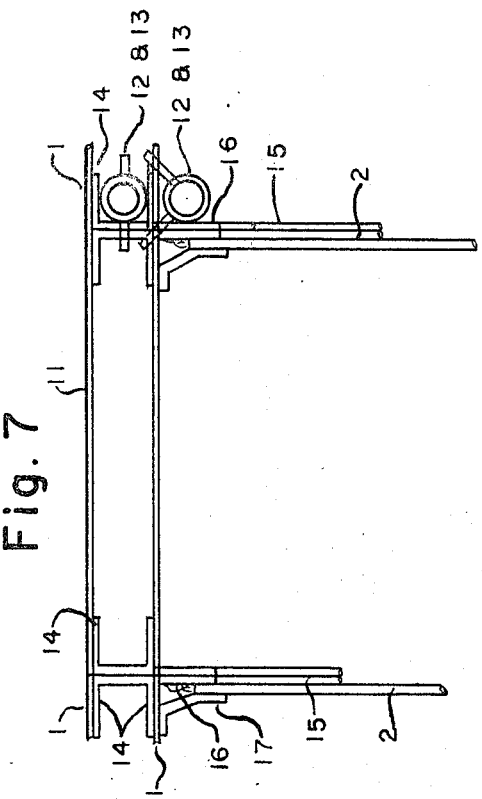
Figure 8:
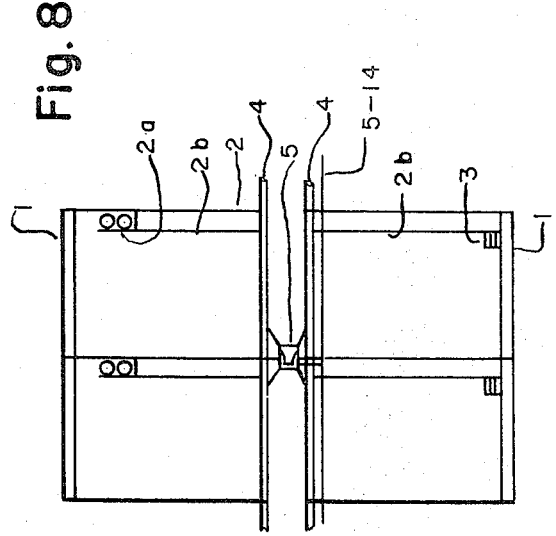
Figure 9:
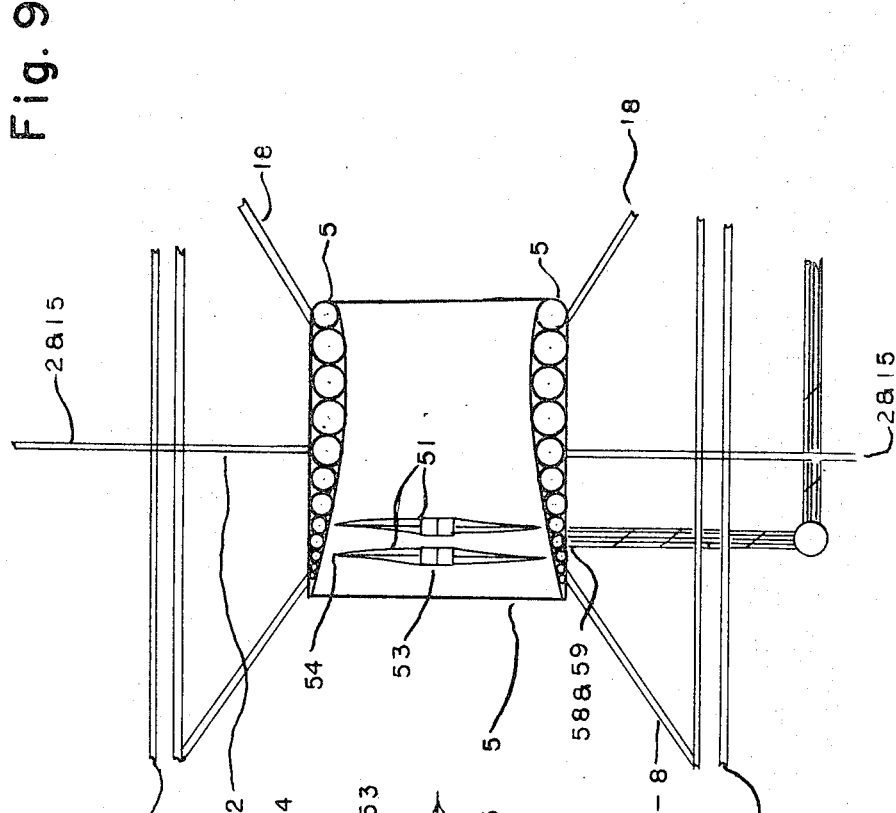
Figure 10:
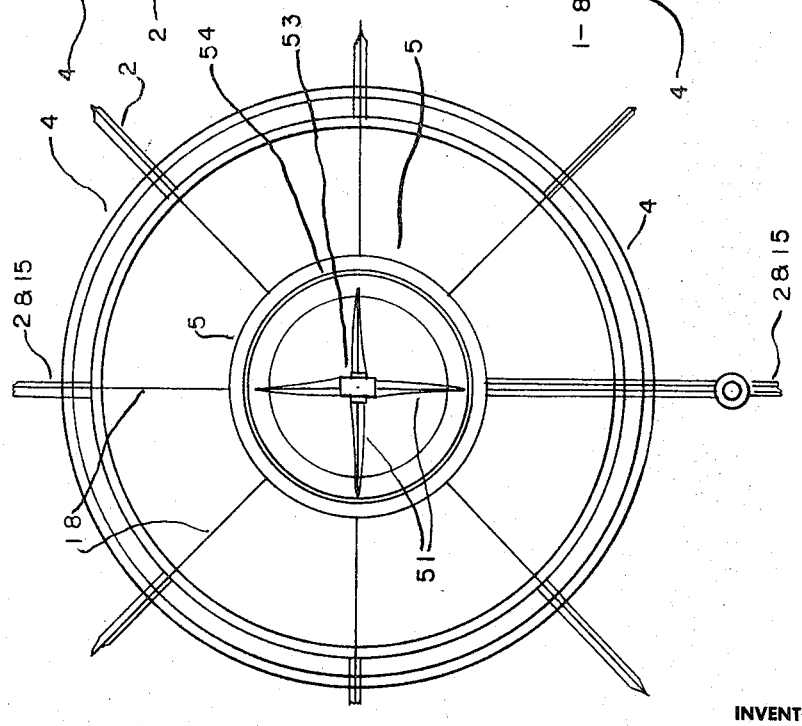

In the foregoing general description, I have set out certain objects, purposes and advantages of my invention. Other objects, purposes and advantages will be apparent from a consideration of the following description and the accompanying drawings in which:

FIG. 1 is a side or starboard elevation of a lighter than air craft according to my invention;
FIG. 2 is a bow view of the craft of FIG. 1;
FIG. 3 is a stern view of the craft of FIG. 1;
FIG. 4 is a bottom view of the craft of FIG. 1;
FIG. 5 is a section through the wall of the pressurized envelope of the craft of FIG. 1;
FIG. 6 is an end elevation of a main cell wall;
FIG. 7 is an enlarged fragmentary section of the envelope wall and cell wall connection;
FIG. 8 is a fragmentary vertical section of the envelope and axial duct;
FIG. 9 is an enlarged vertical section of the wing or duct;
FIG. 10 is an enlarged section on the line X—X of FIG. 9;
FIG. 11 is an isometric cut away view of the fore, aft and center portions of the annular wing or duct;
FIG. 12 is an enlarged fragmentary section of the end portion and propellers of the wind duct or wing;
FIG. 13 is a section of the propellor section of the wind duct;
FIG. 14 is a top plan view of a cryogenic tank according to this invention;
FIG. 15 is a fragmentary vertical section of an infrared heating system according to my invention;
FIG. 16 is a top plan view of the heating system of FIG. 15; and
FIG. 17 is a fragmentary section of a ball valve and control for the helium circuit of my invention.

Referring to the drawings I have illustrated a pressure envelope 1 of elongated elliptical or cigar shape. The envelope is preferably made of Mylar or Mylar film with fiber glass cloth reinforcement and with a very fine magnesium or aluminum film sprayed thereon using a flexible epoxy resin vehicle for the metal film. The envelope wall is preferably made up of spaced wall members 11 and 11a forming a cell which is filled with helium through lines 13 and valves 12. Spaced curtain tapes 16 with a hookless or similar fastener are spaced annularly around the interior of the envelope 1 to receive main cell walls or bulkheads 2 which divide the envelope into a plurality of main cells and are fastened to tapes 16 by hookless fastener means. The main cells are filled with helium from lines or hoses 13 and valves 12. Guy or brace wires 15, preferably of woven fiber glass tape covered with epoxy resin are fixed to the cell wall or bulkhead.

The guy or brace members 18 made of woven fiber glass, braided and covered with flexible epoxy resin are sealed into the main cell to cancel out chaffing. These radiate to the center of the cell around the wind tunnel 5 running through the inflated tube 4 to support the wind tunnel 5 and to support the circular wing drive in place. Struts 18 to brace the circular wing drive within tunnel 5 are flat braided woven glass fiber tape with flexible epoxy resin, their edge turned to the wind for streamlining or as desired and needed. The cells and curtain tape zippers are sealed over with Mylar. However, this Mylar seal bridges the zippers to allow for quick replacement or rebuilding. Thus the cells hold helium and act as bulkheads in the hold of a ship. There are two Mylar tubes 2a and 2b fourteen inches in diameter on each bulkhead 2. They run vertically up the center of the cell curtain. One tube is for fourteen inch balloons 100. These balloons are inflated with helium and as they are released into the cell are sprayed with acetate and acetone cement by a conventional spray head located at the top of Mylar tubes 2a and 2b. These are released selectively by a remotely operated gate and seal any holes shot into the envelope by being pulled to any outlet or fault immediately by the escaping gas. The second tube is to pump helium out of or into cells. This gives complete control as to gas displacement thus allowing entire weight of ship to act as ballast. This tube also connects to cryogenic system 30 in cabin 9, this compresses gas to liquid by freezing, as will be described hereafter and may take any of a variety of well-known forms, any of which may be used.

Reserve cells 3 are stored above wind tunnel 4 or in the lower part of the ship's envelope at the bottom of the main cell. Reserve cells are extremely light and the same size as main cells and are normally completely collapsed. Reserve cells can be inflated at will sucking gas from one cell and releasing it into the new reserve cell as needed. Radio control or manual control may be provided. This allows one to salvage a ship on station even miles away and can serve just as well as though nothing had happened. These reserve cells are used where the damage to the envelope is such that the balloons 100 are incapable of making a seal.

The thrust means illustrated consists of a wind tunnel 5 made of adjacent annular rings of Mylar and woven fiber glass cloth inflated to 20 to 30 p.s.i. Twin propellers 51 mounted in tunnel 5 are counter-rotating and driven from their outer circumference. Selsyn motors mounted in the propellers act to feather the blades as needed from forward to reverse. The rim drive or gear 54, 52 has a hollow shaft which runs through the propellers allowing the propellers to be feathered by Selsyn motor housed in center of propeller shaft or in rim drive which seats in cannelure built into circular wing. Pinion helical gear 54 drives helical ring gear 52 on upper plane of gear, rim plane ring gear drives rim drive or geared rim causing one propeller and rim drive to turn in one direction and other propeller and rim drive to turn opposite. Electric contact is through a groove built into the circular wing to power the Selsyn motors which are built into props or the rim drive to reverse them in well-known manner or feather them. Electric wires or leads from contact 60 go to Selsyn motor 53. The circular wing uses a circular spar structure throughout the wing foil. Epoxy resin and woven fiber glass cloth tubes, boron fiber, etc. are woven to different diameters on sock weaver. These tubes are then pulled over an inflatable tube and the tubes or layers of cloth tubing built up as needed or desired. The result can be stockpiled to use as needed in all types of structure and laminates.

The circular wing drive can be gimbaled. The aft drive could be gimbaled to facilitate turning ship on its axis. This should be at exit of wind tunnel. The aft drive can act as a fan jet to a ram jet or jet engine or jet turbine; the after system then would be a fan directed into the jet motor and also gives tremendous control to air ship. One circular wing drive should be in a bow, one aft in the stern; this eliminates any theory of tunnel drag, etc. Illustration FIG. 1 shows three such units in wind tunnel. Circular wing drives can be used outboard and inboard. Inboard they can be placed at the entrance to the wind tunnel and exit aft of same for maximum flow of air mass, minimum air drag.

Power train 7 runs vertically up both sides of cell No. 10, counting from bow of ship, then horizontally under wind tunnel to differentials under each circular wing drive. From differentials vertically up through the wind tunnel in sealed housings to the aft end of each circular wing drive, etc. In aircraft or outboard of lighter than air ships, drive shafts run through circular spars of wing foil. The power train drive shaft uses the hollow shaft within a hollow shaft system. This allows one to lash up or align the drive shaft at will or as desired or needed. The inner shaft turning inside the outer hollow shaft, etc.

Hatchway 8, illustrated in FIGS. 1 and 4 runs vertically up through the ship, from the after part of cabin 9, vertically through center of cell No. 10, counting from the bow, to the top of envelope. The hatchway 8 can be used to load or unload top or bottom. The hatchway simplifies loading of fuel, equipment, personnel.

In FIG. 13 I have illustrated a de-icing and cooling arrangement for use in connection with this invention as well as in other forms of aircraft. In this arrangement I use the infrared heater illustrated in FIGS. 15 and 16 in a closed circuit containing $CO_2$. In the circuit shown the infrared unit heats aluminum shield that it is housed in. This in turn heats up the aluminum liner in the circular spar of the leading edge 20 of the wing foil on circuit wing foil. This heats up the enclosed $CO_2$ gas which causes it to expand when heat increases, when gas is expanded to sufficient pressure, two one way valves, one in wing root area in front of infrared heater, the other at the wing tip, adjusted to pressure needed, allows gas to escape through a small venturi aperture into one of the other spars, this immediately cools the gas to an acceptable temperature and can be recirculated again and again, a thermocouple and thermostat control the infrared heater for use as a de-icer. However, this system can be used at greater temperatures and thus produce a greater pressure. Under pressure through a small venturi, it would create frigid temperature. Using a series of venturis in a circle, each one a different size, corresponding to temperature desired, one could turn the venturi unit or system to the temperature needed or desired and use it as a cooling system for power plant and power train, for keeping liquid helium intact, and use the cooling side as a cabin heater, water heater, or use it as a heater as needed. To attain just the opposite effect one would need four valves and two venturi units to reverse the system when needed. Re-entry heat and high speeds in SST plus, etc. make freezing the leading edge and wing foil a valuable asset.

In FIG. 13 I also show a spray bar 21a at the trailing edge of the wing 21. This may be used for discharging smoke for cover screens, for tear gas, dyes, etc.

In FIG. 14 I have illustrated a cryogenic vessel for use with my invention. In this vessel I use liquid helium to compress and store quantities of gas by freezing to 450° and below 0° F. I use helium liquid as super cold source and house this in our cryogenic system. This allows me to pump helium gas from my main cells to my cryogenic system or storage unit. This is cooled then super cooled to a liquid thus allowing us to conserve our helium when it expands at greater altitudes rather than valving the gas outboard. This allows me to use the weight of the ship as ballast as needed or desired. This means I have a light, simple system in place of water recovery system to compensate for the loss of weight due to the consumption of fuel and other variables that occur in temperature ranges and ship control. This means I have a greater weight lifting factor since the above ballast systems eliminated can be used as greater payload. I also acquire a greater control of the ship and its ability to overcome the elements to usefully apply it as a VTOL lifting body as well. This is due to my ability to carry a greater volume of gas at sea level than ever before since I do not have to allow for altitude expansion, this I liquefy. Again a greater useful load gain. My cryogenic system is made up of a liquid helium cell 31 made of woven fiber glass cloth and rigid epoxy resin, silica gel 32 in a cell also made of woven fiber glass cloth and rigid epoxy resin, an air space 33 and an outer shell 34. The outer shell 34 is made up of layers of urethane foam and aluminum foil between inner and outer shells of fiber glass and epoxy resin. The shell is suspended by woven tapes of fiber glass. The cryogenic system is mounted in the cabin 9.

This will keep liquid helium at its original temperature. I precool the helium gas in the regulator 38 or classifier 37 before I allow it to suck back into the liquid helium. This is a natural attraction or sucking action. I therefore will not need to replace or reliquefy the helium for a considerable period. Our de-icing and cooling system can be very usefully applied here using the cooling cycle, or making one closed cycle for this system alone.

In the infrared heating system illustrated in FIGS. 15 and 16 I provide an infrared lamp 41 within an aluminum housing 42 mounted and may take any of a variety of well-known forms, any of which may be used. This housing accumulates heat and radiates it into the helium gas pipe 70, which is an inflated Mylar pipe made up of an outer Mylar filament woven glass fiber cloth sprayed with a film of aluminum in a flexible epoxy resin vehicle 71. Inner filaments 72, 73 and 74 are connected to the outer filament to provide a sealed assembly. The filament 72 is preferably Mylar, fiber glass cloth, resin binder and Teflon impregnated glass. Filament 73 is Teflon, resin binder, glass cloth and Teflon in successive layers and filament 74 is Teflon, glass cloth resin binder. The member 75 is a connecting seal to the helium system.

In FIG. 17 I have illustrated the following parts assembled in the helium system.

80 ball valve is provided, with hole in center equal to the size of pipes inside diameter. Inside ball valve made of Mylar, hollow sphere. Outside of the ball valve sphere is fiber glass woven cloth impregnated with Teflon, covered with smooth Mylar sprayed with aluminum to act as gas barrier. The handle or stem arbor is cast with ball, or attached to it. Manual or electric driven, radio control is preferred for operation of this valve.

82 ball valve casing or seat inside is smooth, Teflon coated to match Teflon coated ball valve. The outside is fiber glass impregnated with Teflon, covered with flexible epoxy resin binder, then Mylar film impregnated with aluminum or magnesium or sprayed on.

83 Selsyn motor, housing, gear on inside, engages geared handle or stem arbor attached or cast as part of ball valve to open or close by radio control, manual control or by automatic control through thermocouple and thermostat.

82 ball valve casing and seat is made in two halves for quick assembly. In fourteen inch gas tubes or pipes the ball valves are made of same materials and method as inflated gas pipe for helium and other media. The inside of the ball valve is a hollow sphere which requires $CO_2$ or helium gas to inflate. Other procedure the same. Inflate gas area between inner and outer filaments of outer casing and sphere as well. Carry inflating idea into stem, etc., the pressure will insure stiffness and operation of stem gear and pinion gear of Selsyn motor. Ball valves can be made of any materials acceptable to a given need and used for any and all purposes. Two halves can be sealed with flexible epoxy resin with Mylar, fiber glass cloth tape and aluminum or magnesium impregnated in Mylar or sprayed on acting as seal and binders.

I claim:
1. A lighter than air craft comprising an outer gas impervious envelope, a plurality of transverse walls dividing said envelope into a plurality of separate main cells, an axial duct extending horizontally through said envelope from one end to another to provide an open passageway therethrough and thrust means in said duct carrying air from one end for discharge through the other end of said duct to propel said envelope, a plurality of reserve cells in each main cell, means for selectively inflating each separate reserve cell, a cryogenic vessel mounted on said envelope to receive and discharge gas thereto, a source of liquid helium coolant and pump means for compressing helium into said cryogenic vessel whereby helium can be removed from the envelope and compressed and thereby saved when it is desired to reduce the lift of the envelope.

2. A lighter than air craft as claimed in claim 1 wherein each transverse wall is provided with a container carrying a plurality of inflated balloons, means for selectively releasing said balloons into said separate cells and simultaneously spraying said balloons with adhesive cement when a fault occurs in the envelope at said cell whereby the fault is sealed by movement of the balloon to the fault.

3. A lighter than air craft as claimed in claim 1 wherein infrared heating means are provided for heating and expanding helium into the envelope.

4. A lighter than air craft as claimed in claim 1 wherein the thrust means is at least one pair of counter rotating propellers.

5. A lighter than air craft as claimed in claim 4 wherein the propellers are driven by annular ring gears at the outer ends of the propellers and by a drive pinion engaging the same.

6. A lighter than air craft as claimed in claim 4 wherein the propellers are feathered by Selsyn motors within the propeller assembly.

7. A lighter than air craft as claimed in claim 1 wherein the envelope is made of Mylar and fiber glass cloth.

References Cited

UNITED STATES PATENTS

| | | | |
|---|---|---|---|
| 1,835,260 | 12/1931 | Barrera | 244—30 |
| 2,778,585 | 1/1957 | Tschudy | 244—30 |
| 2,929,581 | 3/1960 | Johnson | 244—30 |
| 3,006,577 | 10/1961 | Schott | 244—30 |
| 3,079,106 | 2/1963 | Whitnah | 244—30 |
| 3,180,590 | 4/1965 | Fitzpatrick | 244—30 |
| 3,185,411 | 5/1965 | Gembe | 244—30 |
| 3,346,216 | 10/1967 | Desmarteau | 244—30 |
| 3,361,107 | 1/1968 | Weber | 115—34 |
| 3,369,774 | 2/1968 | Struble | 244—31 |

OTHER REFERENCES

Installation Manual For Curtiss Electric Propellers, 1950, pp. 552, 558.

MILTON BUCHLER, Primary Examiner

J. L. FORMAN, Assistant Examiner